(12) United States Patent
Awadi

(10) Patent No.: US 8,205,865 B1
(45) Date of Patent: Jun. 26, 2012

(54) UNIVERSAL JIG TOOL

(75) Inventor: Haytham Awadi, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 853 days.

(21) Appl. No.: 12/236,870

(22) Filed: Sep. 24, 2008

Related U.S. Application Data

(60) Provisional application No. 60/988,303, filed on Nov. 15, 2007.

(51) Int. Cl.
*B23Q 3/00* (2006.01)
*B23B 49/02* (2006.01)

(52) U.S. Cl. ........ 269/295; 408/241 G; 269/16; 269/292

(58) Field of Classification Search .............. 269/289 R, 269/295, 292, 16, 126, 127, 900; 408/103, 408/115 R, 241 B, 241 G, 115 G
See application file for complete search history.

(56) References Cited

U.S. PATENT DOCUMENTS

| | | | | |
|---|---|---|---|---|
| 2,416,010 | A | * | 2/1947 | Klosz ........................ 408/115 R |
| 4,863,151 | A | | 9/1989 | Justesen |
| 5,108,242 | A | * | 4/1992 | Fisher .......................... 269/127 |
| 5,980,167 | A | * | 11/1999 | Chen .............................. 408/87 |

* cited by examiner

*Primary Examiner* — Hadi Shakeri
(74) *Attorney, Agent, or Firm* — Lathrop & Gage LLP

(57) ABSTRACT

The disclosed embodiments include a rectangular jig tool that has a substantially rectangular body with a square cross-sectional shape, and this able to be held in a vice. The device has a number of features which enable the drilling of aircraft parts. First, the longitudinal slot is used to receive one portion of a part, and allow another portion to extend over a recess in the tool. When the drill passes through the part, it does not damage the tool because the recess accommodates. An optional clip-on feature is also provided which holds the parts in the longitudinal channel so that they are secured during drilling. Other parts are inserted such that they extend out away from a longitudinal slot in the tool for uninterfered drilling. Another features includes a longitudinal corridor/slit arrangement that allows a number of parts to be securely held and stick out from the device for drilling.

7 Claims, 4 Drawing Sheets

UNIVERSAL JIG TOOL

RELATED APPLICATIONS

This application claims the benefit of U.S. Provisional Patent Application No. 60/988,303 filed Nov. 15, 2007, the contents of which are herein incorporated by reference.

BACKGROUND OF THE INVENTION

1. Field of the Invention

The disclosed embodiment relates generally to the field of machining materials. More specifically, the embodiment disclosed relates to the field of drilling sheet metal parts for, i.e., later assembly, and the devices used for like purposes.

2. Description of the Related Art

Conventionally, sheet metal parts can be drilled using a variety of techniques. One technique involves the user simply securing a sheet-metal part using one hand to secure the part, and the second hand to operate the drill. Oftentimes, however, this technique is unacceptable because the user is unable to adequately secure the part against the torque of the drill. Another method involves securing the part in a vice. As is well known, a vice has a movable jaw that is brought forward to a stationary jaw to secure a workpeice. A vice alone may be acceptable for drilling one or a few parts, but for large-scale projects, the time it takes to repeatedly secure, drill, and then release each part is too great.

SUMMARY

The present invention is defined by the claims which will be presented later. In embodiments, the invention is a production tool having a body. The tool also includes a securing system which receives a first portion of a part and holds it so that a second portion of the part can be machined through, e.g., drilled. The body also, in embodiments, includes a recess defined in the body. The recess allows the drill bit to pass through the second portion without engaging the tool. In some embodiments the machining tool is a drill.

In some embodiments, a locking member is provided. The locking member is securable onto the tool over the slot to securely lock the first portion into the slot while the second portion remains exposed for machining. In embodiments the locking member includes first and second depending ends, each depending end having an inwardly extending flange which is receivable into a corresponding recess at each of the first and second ends for the purpose of securing the locking member onto the tool. The locking member may, in the disclosed embodiment, be adapted to extend over and lock in a second part.

In some embodiments, the tool is used to machine aircraft parts and in some instances an anchor assembly.

In some cases, the recess in the body is a longitudinal slot. Similarly, the securing system for accommodating the first end can be a longitudinal slot. In some embodiments, the tool is adapted to be securable in a vice.

Alternatively, the tool body can be adapted such that it secures the first portion of the part, and the second portion is exposed and extends outward such that a machining tool is able to machine through the second portion without damaging the body. In some embodiments of this variation, the receiving area comprises a longitudinal corridor which is adapted to slidingly receive the first portion at a first end of the device. The corridor includes a longitudinal slit which enables the second portion to extend outward away from the body for machining.

In some embodiments the body is of a two-part construction comprising an upper body portion and a lower body portion. Alternatively, the body could be molded to be integral. Where this two-part construction is used, and a longitudinal corridor is the securing system, the corridor and longitudinal slit can both be defined between the upper and lower body portions.

In some embodiments, the body comprises opposing longitudinal corridors with longitudinal slits, the corridors and slits adapted to expose portions of numerous aircraft parts for drilling.

The disclosed embodiments also include a machining process. This process involves securing the first portion of the part in the body of the jig tool such that a second portion of the part is exposed and is able to be drilled through without damaging the body. This process, in one embodiment, involves locating the second portion over a recess defined in the body during the securing step. Alternatively, embodiments of the process may involve extending the second portion outward from the body during the securing step.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
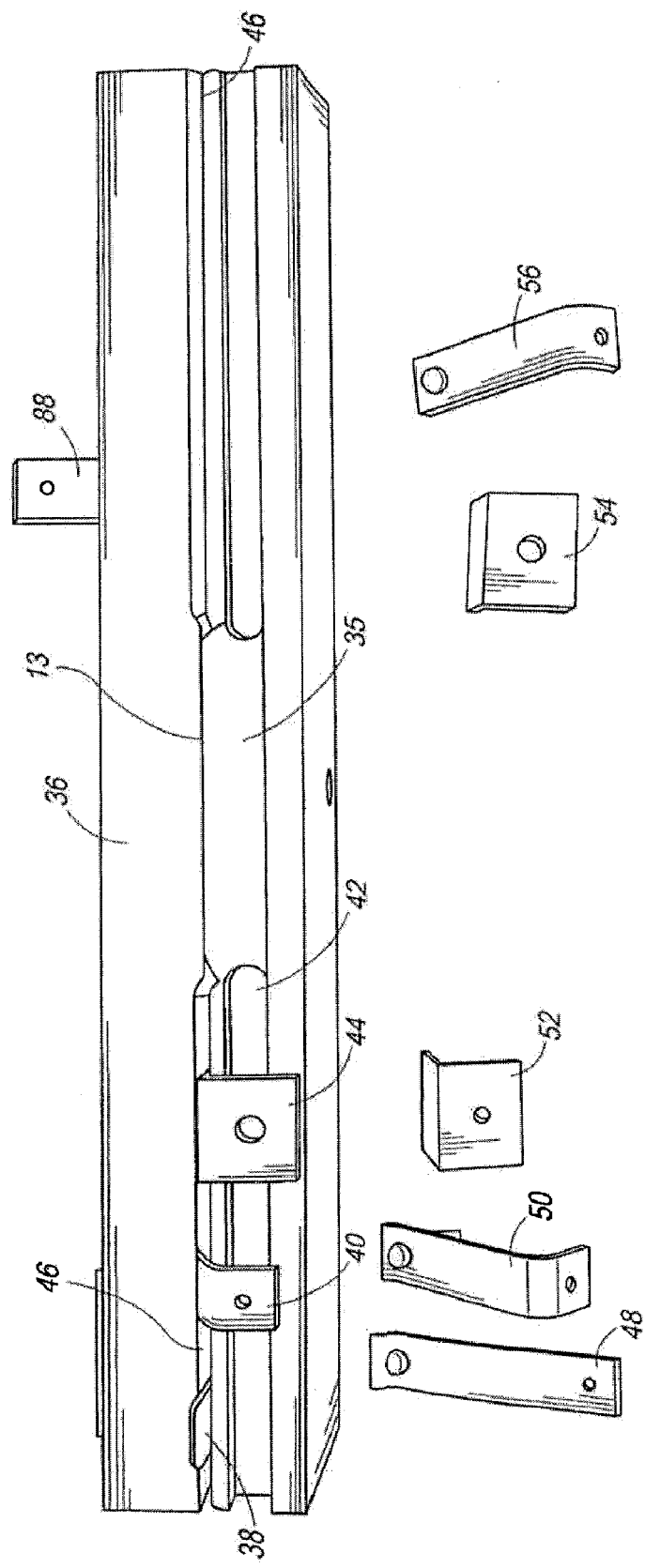
FIG. 1 is a front view of the jig tool.

The disclosed embodiment is designed to help assembly operators and other individuals involved in the field of sheet metal assembly in drilling parts in a much more efficient and effective manner and safer for the operators. The embodiment of the device disclosed herein is especially useful for drilling operations. Referring to FIGS. 1-6, an embodiment for a jig tool device 100 is shown which is useful in manufacturing processes. Especially processes where large numbers of sheet metal parts need to be drilled—normally in the assembly process. Tool 100, in embodiments, is used as a supplemental device to hold several parts at a time, and securing the parts so that they can be effectively drilled by the user. Using this device, the product produced is improved, injury rates are lowered, and efficiency is increased.

Generally, jig tool 100 comprises two aluminum block portions which collectively form a rectangular block having a substantially square cross section. This shape makes is easily securable in a vice if desired. A top block portion 36 is fastened to a bottom portion 35 using three screws, one from the bottom and two on top (only one, a screw 67, in the top portion of the tool in FIG. 2 because part 72 obstructs the second top screw; a reflection 21 of both top screws, however, can be seen in FIG. 3; the third screw that comes up through the bottom is not seen in any figure). The two blocks are joined at a solid interface 13. It should be noted that this two-piece construction could be accomplished using many different fastening techniques. For example, an adhesive could be used to fix the upper 36 and bottom 35 portions together instead of screws. Further, the entire apparatus 100 could be manufactured to be of a completely integral construction through some sort of molding processes. Therefore, these disclosures should not be interpreting any limitation to a two-piece construction unless otherwise specified in the claims.

Figure 2:
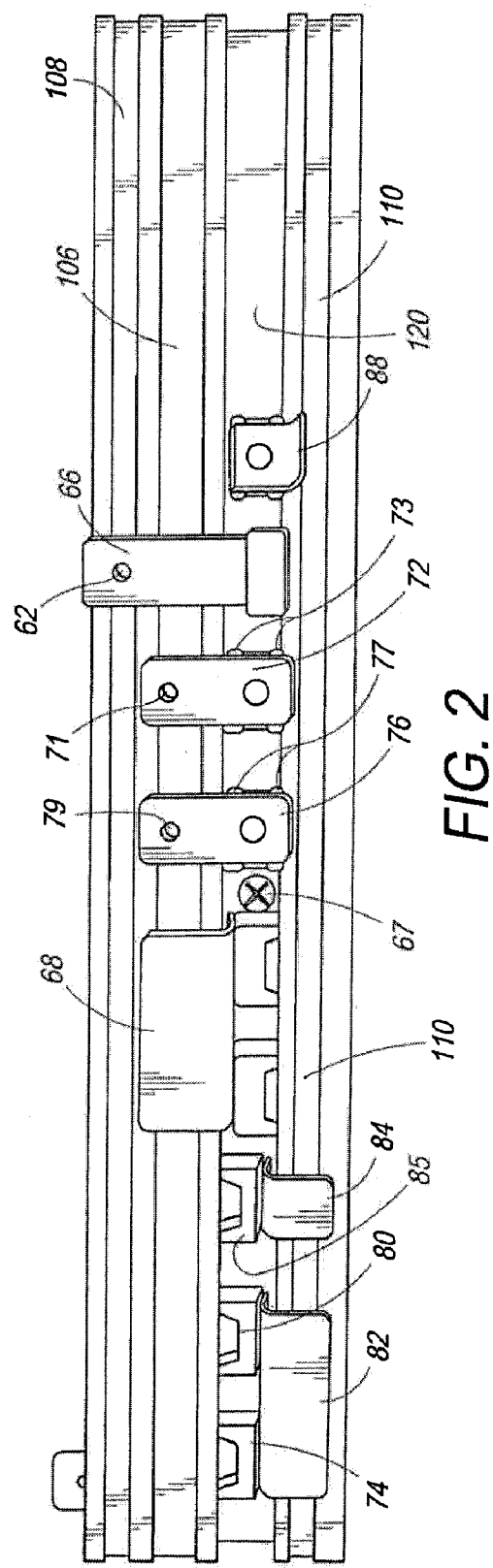
FIG. 2 is a top view of the jig tool.
Figure 3:
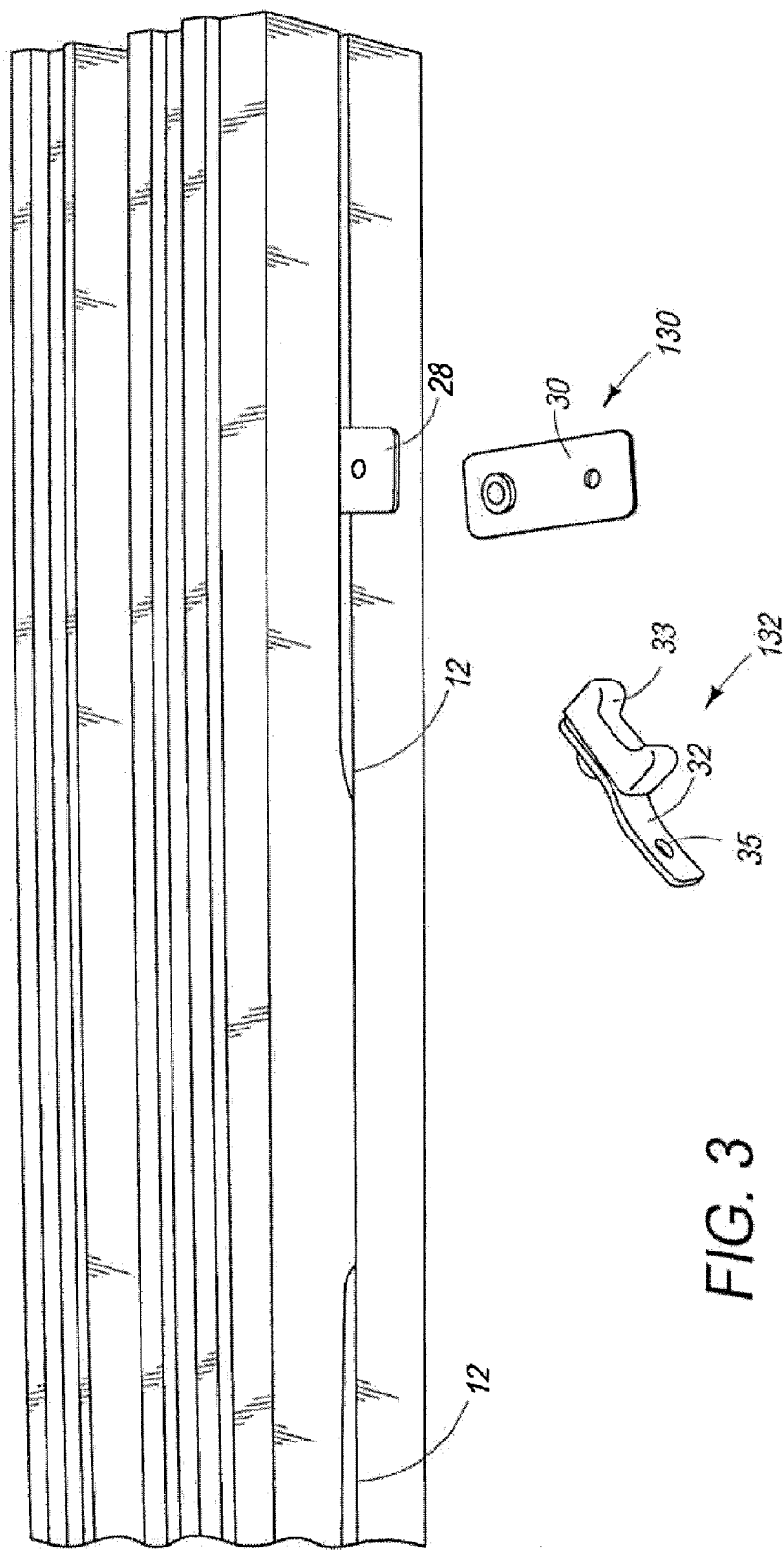
FIG. 3 is a top and back view of the jig tool.

The tool, in embodiments, is slotted to house and accommodate small sheet metal parts that will be inserted into the tool and locked into position so that they can be drilled. FIGS. 1-3 show a variety of ways in which this can occur. Referring to these figures, jig tool 100 is shown as being useful to secure a variety of parts—for example, parts 48, 50, 52, 54, 56, 38, 40, 44 in FIG. 1; parts 82, 84, 68, 76, 72, 66, 88 as viewed from left to right in FIG. 2; and parts 28, 130, and 132 in FIG. 3, so that they can be drilled by a user.

The parts shown in FIGS. 1-3 are known in the aircraft manufacturing industry as anchor assemblies. Some anchor assemblies include a plastic portion (see, e.g., portion 33 in FIG. 3). It should be understood that the broad concepts of the disclosed tool would extend well beyond the particular parts disclosed and would be useful in the production of numerous other kinds of parts and in numerous other environments.

Referring to FIG. 3, two anchor assemblies 130 and 132 can be seen that are not yet secured in the tool. Looking at part 132 in FIG. 3, it can be seen that the part includes a substantially planar sheet metal portion 32 as well as a plastic receiving portion 33 which is riveted on to the sheet-metal portion 32. This is a typical anchor assembly that is used for bundling and securing wires. In these types of anchor assemblies, a hole 35 has already been bored using device 100 so that the anchor assembly can be secured to a skin or other portion of an aircraft. Then, the channel in the plastic receiving portion 33 is used to receive a bundle of wires that are secured to the anchor using zip ties of some other fastening mechanism. Other kinds of anchor assemblies (e.g., parts 52 and 54 in FIG. 1) are bent and have no plastic receiving portions.

As will be discussed in more detail later, tool 100 can accommodate these and other kinds of parts. Still further, tool 100 includes means to perform both holding and drilling simultaneously for numerous parts at the same time.

Figure 4:
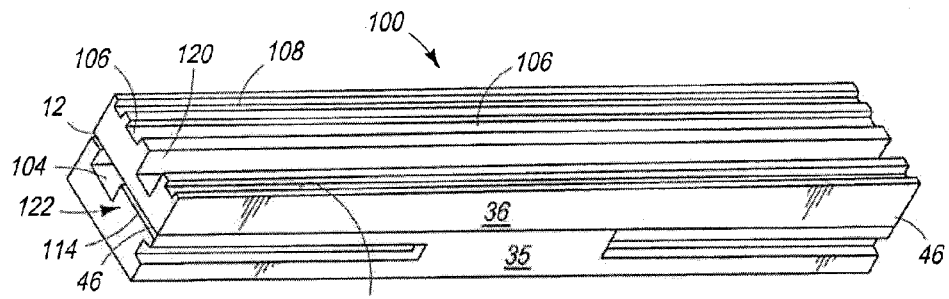
FIG. 4 is a top and front view before introduction of the securing member.

Referring to FIG. 4, it can be seen that tool 100 includes a number of longitudinal slots 106, 108, and 110. These slots will be used to provide a recess into which the drill bit can pass into after pushing through the sheet metal anchor assembly being drilled. Also on top of the tool is a larger longitudinal channel 120 which is used to receive the plastic receiver portion of anchors to secure them as shown in FIG. 2.

In FIG. 2, it can be seen that the parts are arranged in a variety of ways. Some, e.g., 76 and 72, are arranged upward on the page and have receiving portions 77 and 73, respectively, which are slid into and secure the parts into channel 120 so that they can be drilled. These parts, as shown in the figure, have already been drilled through and into channel 106 to create holes 71 and 79. Another, part 66 has been drilled through into channel 108 to form hole 62. Yet another, part 68, has not yet been drilled, but appears to be arranged such that it will be drilled through into channel 106 to create a hole. Other parts 82 and 84 are shown as having receiving portions 74, 80, and 85 and are oriented to be drilled through into channel 110.

Figure 5:
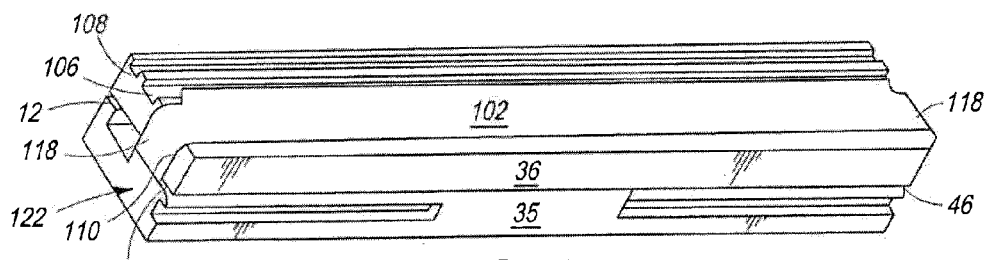
FIG. 5 shows the tool after the clamping member has been installed.
Figure 6:
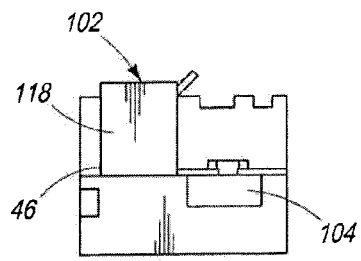
FIG. 6 shows a side view of the tool.

An optional locking device 102 (see FIGS. 5 and 6) can be used to further secure the parts. To do so, the parts should be oriented as desired so that the desired portions to be drilled are exposed and over a slot of choice (selected from slots 106, 108, and 110. FIG. 2 is an example of such an orientation before locking device 102 has been installed. Next, locking device 102 is snapped on as shown in FIG. 5. Although not shown in the figures in detail, device includes inwardly directed flanges (not shown) on depending portions 118 at each end of the locking device 102. These inward flanges are snapped into corresponding recesses 114 in each end face 122 of the tool. Once the locking device is installed, it clamps down on and partially covers the parts. Considering FIGS. 2 and 5 together reveals how the parts would be held down. Even though it is removed in that FIG. 2, FIG. 5 shows how locking device 102 would be positioned on top of the parts. Locking device 102, if snapped on over parts 82, 84, 68, 76, 72, and 88 will more securely lock the receiving portions, e.g., portions 73, 77, 85, 74, 80, et al securely in place, but exposes the portions to be drilled over one of the channels 106, 108, or 110 so that these exposed portions can be drilled through.

Other portions of the device also can be used to secure parts for drilling in different ways. For example, for some parts it may be advantageous for them to be received in a longitudinal corridor 104 provided on each end of the tool and terminating at the interface portion 13 where the upper and lower blocks are secured to one another in solid fashion near the middle of the tool. Longitudinal corridor 104 slidingly receives the plastic receiver portion (e.g., see receiver portion 33 on part 132 in FIG. 3). When slid into corridor 104, an exposed portion of the sheet metal part 28 that is to be drilled is allowed to extend out from a longitudinal slit 12 (see FIGS. 3-5). Only one part 28 (which comprises the exposed portion) is shown installed in FIG. 3, yet one can see how multiple parts can each have their receiver portion slid into corridor 104 while the portion to be drilled can be slid down, and exposed out through slit 12. These lined up parts could then be drilled one immediately after the other without having to make any time-consuming adjustments. Part 28 has already been drilled in the drawing.

For parts having no plastic receiver portions, opposing deep longitudinal recesses 46 are provided on each side of the front (see FIGS. 1 and 4-6) of the tool. These deep recesses 46 begin from the outside ends of the tool, but terminate at the interface midsection 13. These recesses can be used to receive a bent part (e.g., part 52 shown in FIG. 1) or substantially flat anchor assemblies. Substantially flat parts can be secured and then drilled but simply allowing them to extend out from recess 46 as is part 38 shown in FIG. 1. The bent parts (e.g., Parts 40 and 44) can be inserted such that the drill target is over receiving slot 42 as shown. Once so positioned, the desired sized holes can be drilled and the bit received into slot 42.

It will be evident to one skilled in the art the numerous other uses and versatilities exist using the tool. Many different arrangements of the various components depicted, as well as components not shown, are possible without departing from the spirit and scope of the disclosed embodiments. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the possible embodiments.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A production tool comprising:
   a substantially rectangular body defining a top block and a bottom block joined at an interface therebetween, the body having a longitudinal axis;

a securing system in said production tool, said securing system comprising a first recess formed into said body and extending longitudinally along the axis for receiving a first portion of at least one part and hold said first portion of said at least one part in said first recess so that a second portion of said at least one part can be machined through by a machining tool; and a second recess defined in said body, said second portion of said at least one part being positioned above said second recess, thereby enabling said machining tool to pass through said second portion of said at least one part and into said second recess without engaging said production tool.

2. The production tool of claim 1 wherein said machining tool is a drill.

3. The production tool of claim 1 comprising a locking member, said locking member being securable onto said production tool over said first recess to securely lock said first portion of said at least one part into said first recess while said second portion of said at least one part remains exposed for machining above said second recess.

4. The production tool of claim 3 wherein said locking member is adapted to extend over and lock in a second part.

5. The production tool of claim 1 wherein said second recess comprises a longitudinal slot formed in said body.

6. The production tool of claim 1 wherein said securing system further comprises at least one longitudinal slot.

7. The production tool of claim 1 wherein said production tool comprises first and second substantially flat and substantially parallel opposed surfaces such that said production tool is adapted to be securable in a vice.

* * * * *